(12) United States Patent
Liu et al.

(10) Patent No.: US 12,507,323 B2
(45) Date of Patent: Dec. 23, 2025

(54) CERAMIC HEATER AND PREPARATION METHOD AND USE OF CERAMIC HEATER

(71) Applicant: CHINA TOBACCO HUBEI INDUSTRIAL CORPORATION LIMITED, Wuhan (CN)

(72) Inventors: Huachen Liu, Wuhan (CN); Yikun Chen, Wuhan (CN); Dan Li, Wuhan (CN); Tengfei Deng, Wuhan (CN); Tengfei Hu, Wuhan (CN)

(73) Assignee: CHINA TOBACCO HUBEI INDUSTRIAL CORPORATION LIMITED, Wuhan (CN)

( * ) Notice: Subject to any disclaimer, the term of this patent is extended or adjusted under 35 U.S.C. 154(b) by 1370 days.

(21) Appl. No.: 17/261,889

(22) PCT Filed: Jul. 23, 2018

(86) PCT No.: PCT/CN2018/096668
§ 371 (c)(1),
(2) Date: Jul. 22, 2021

(87) PCT Pub. No.: WO2020/019120
PCT Pub. Date: Jan. 30, 2020

(65) Prior Publication Data
US 2021/0410234 A1    Dec. 30, 2021

(51) Int. Cl.
| | |
|---|---|
| *H05B 3/46* | (2006.01) |
| *A24F 40/20* | (2020.01) |
| *A24F 40/46* | (2020.01) |
| *B41M 3/12* | (2006.01) |
| *C04B 41/00* | (2006.01) |
| *C04B 41/51* | (2006.01) |
| *C04B 41/88* | (2006.01) |
| *H05B 3/12* | (2006.01) |

(52) U.S. Cl.
CPC .............. *H05B 3/46* (2013.01); *A24F 40/20* (2020.01); *A24F 40/46* (2020.01); *B41M 3/12* (2013.01); *C04B 41/009* (2013.01); *C04B 41/5133* (2013.01); *C04B 41/88* (2013.01); *H05B 3/12* (2013.01); *H05B 2203/017* (2013.01)

(58) Field of Classification Search
CPC ........... A24F 40/46; A24F 40/20; B41M 3/12; C04B 41/009; C04B 41/88; H05B 3/12
USPC ............................................ 219/543
See application file for complete search history.

(56) References Cited

U.S. PATENT DOCUMENTS

| | | | |
|---|---|---|---|
| 1,675,038 A | | 6/1928 | Marrec |
| 1,688,484 A | | 10/1928 | Carter |
| 3,956,558 A | * | 5/1976 | Blanco ...................... C03C 8/12 428/428 |
| 2005/0260410 A1 | * | 11/2005 | Fujikawa ............. C01G 23/003 501/137 |

FOREIGN PATENT DOCUMENTS

| | | | | |
|---|---|---|---|---|
| CN | 204598339 | | 8/2015 | |
| CN | 104886785 | | 9/2015 | |
| CN | 105472791 A | | 4/2016 | |
| CN | 106714342 A | * | 5/2017 | ............... H05B 3/00 |
| EP | 1721490 A1 | | 11/2006 | |
| EP | 3031784 A1 | | 6/2016 | |
| GB | 598007 | * | 9/1948 | ............... H05B 3/00 |
| JP | 10302938 | | 11/1998 | |
| JP | 2009210572 A | | 9/2009 | |
| JP | 2013212983 A | | 10/2013 | |
| JP | 2016510993 A | | 4/2016 | |
| JP | 2017069198 A | | 4/2017 | |
| JP | 2018504130 A | | 2/2018 | |
| JP | 2018088918 A | | 6/2018 | |
| KR | 20170095967 A | | 8/2017 | |
| WO | 2017193958 A1 | | 11/2017 | |
| WO | 2020019120 A1 | | 1/2020 | |
| WO | 2020057046 A1 | | 3/2020 | |
| WO | 2020228775 A1 | | 11/2020 | |

OTHER PUBLICATIONS

Machine Translation of CN-106714342-A (Year: 2025).*
Search report for International Patent Application PCT/CN2018/096668, mailed on Jan. 30, 2020.
EP Search Report; Application No. 18927243.8-1202; Dated Jan. 28, 2022, Entire document.
Translated JP Office Action; Application No. 2021-503090; Dated Nov. 15, 2021, Entire document.
Translated KR Office Action; Application No. 10-2021-7002180; Dated Jan. 21, 2021, Entire document.

* cited by examiner

*Primary Examiner* — Edward F Landrum
*Assistant Examiner* — Thomas J Ward
(74) *Attorney, Agent, or Firm* — BOND, SCHOENECK & KING, PLLC; George R. McGuire

(57) ABSTRACT

The present disclosure provides a ceramic heat generation body and a preparation method thereof. The ceramic heat generation body includes a ceramic rod matrix, and electronic paste is printed on a surface of the ceramic rod matrix in a decalcomania manner. The preparation method includes printing the electronic paste on the ceramic rod matrix in the decalcomania manner. In addition, the present disclosure further provides a use of the ceramic heat generation body in a heater for novel tobacco products.

13 Claims, No Drawings

CERAMIC HEATER AND PREPARATION METHOD AND USE OF CERAMIC HEATER

TECHNICAL FIELD

The present disclosure relates to the field of heat generation devices, and in particular to a ceramic heat generation body, and a preparation method and use of the same.

BACKGROUND

The ceramic heating body is a kind of high-efficiency heater with uniform heat distribution and excellent thermal conductivity, and can ensure a temperature uniformity of the heated surface, thereby eliminating hot and cold spots of the equipment. In addition, the ceramic heating body also has following advantages, such as, a long lifetime, a good insulation performance, a strong mechanical property, a corrosion resistance, and a magnetic field resistance. At present, there are two main types of ceramic heating bodies, which are PTC ceramic heat generation body and MCH ceramic heat generation body, respectively. The materials adopted by the two products are completely different, and merely the finished products are similar to ceramics. Thus, they are collectively referred to as the "ceramic heat generation body". The PTC ceramic heat generation body is a thermistor, which is composed of a PTC ceramic heat generation element and an aluminum tube. Due to advantages of a small thermal resistance and a high heat exchange efficiency, the PTC ceramic heat generation body is an electric heater having properties such as automatic temperature controlling and power saving. Compared with the PTC ceramic heat generation body, the MCH ceramic heat generation body, which is a new type of high-efficiency, environmentally-friendly and energy-saving ceramic heat generation element, uses alumina ceramics and can save 20-30% electric energy under the same heating effect.

In the current field of low-temperature cigarettes, the MCH ceramic heat generation body is generally adopted as a heat generation element. Specifically, in the MCH ceramic heat generation body, a metal heat generation layer is printed on a ceramic substrate by screen printing. That is, a high-temperature refractory metal (e.g., molybdenum, tungsten or the like) is adopted as an inner electrode of the heat generation circuit, the MCH ceramic heat generation body is namely a high-efficiency and energy-saving ceramal heat generation body obtained by co-firing in a reducing atmosphere at 1400 to 1800° C. through a series of special preparation processes. During the process, an alumina casting green body generally serves as an insulating layer and a matrix, and a prepared high-temperature metal thick-film paste wire is printed on a surface of the green body. Afterwards, the upper and lower alumina ceramic substrates are laminated and sliced, and then soldered with lead wires after being sintered in a hydrogen reduction furnace at a high temperature to thereby prepare the MCH heat generation body. However, the inner electrode is included in the middle of the alumina ceramic on both sides, and the alumina ceramic absorbs heat. Thus, the heat generation efficiency of the inner electrode is not high, and thereby the efficiency of the entire ceramic heat generation body is not high. Furthermore, the addition of the green body may cause the ceramic heat generation body to be thicker and thereby not easy to be inserted into and extracted from the low-temperature cigarettes. Although the prior art discloses a variety of electronic paste products for preparing the heat generation element, the heat generation element prepared by the electronic paste of the prior art have different batches, which leads to an extremely large deviation in the temperature coefficient of resistance (TCR) and thereby causes a great difficulty in controlling the resistance. Consequently, the defective rate of the product may be extremely high, the error of TCR of the product may be very large, and the circuit program may fail to control the temperature accurately. In addition, in terms of the existing electronic paste products, it is difficult to achieve a low TCR while ensuring that the TCR has a satisfactory error.

SUMMARY

The present disclosure aims to overcome the aforementioned defects in the prior art, and provides a ceramic heat generation body to complete the present disclosure, wherein the ceramic heat generation body can generate heat quickly, can be inserted into and extracted from low-temperature cigarettes easily, and has incredibly consistent and low TCR in different batches.

After a lot of experiments, the inventor of the present patent has surprisingly found that each batch of the products prepared by the electronic paste composed of certain components has an incredibly consistent TCR and the TCR is satisfactorily low, so that the inventor obtains the present disclosure.

In order to achieve aforesaid aims, in an aspect, the present disclosure provides a ceramic heat generation body, comprising a ceramic rod matrix, wherein a resistance heat generation element is provided on a surface of the ceramic rod matrix, and the resistance heat generation element is an alloy containing tungsten, manganese and at least one selected from ruthenium, tellurium, germanium, and vanadium.

According to a preferred embodiment of the present disclosure, a material of the ceramic rod matrix is at least one of aluminum oxide, silicon nitride, glass, aluminum nitride and silicon carbide.

According to a preferred embodiment of the present disclosure, the resistance heat generation element is prepared by printing electronic paste in a decalcomania manner, wherein the electronic paste contains tungsten, manganese, an additive and an organic vehicle, the additive being selected from at least one of the ruthenium, tellurium, germanium and vanadium.

According to a preferred embodiment of the present disclosure, an end of the ceramic rod matrix is a tapered end, and preferably, the resistance heat generation element near the tapered end in a length direction of the ceramic rod matrix has a size larger than that of an other end.

According to a preferred embodiment of the present disclosure, a weight ratio of the tungsten and manganese is 7:3 to 9.5:0.5. According to a preferred embodiment of the present disclosure, a content of the additive is 0.5-5 wt % based on a total weight of the tungsten and manganese. According to a preferred embodiment of the present disclosure, the organic vehicle is a mixture of terpineol, ethyl cellulose and absolute ethanol, and preferably, a content of the organic vehicle is 5-20 wt % based on the total weight of the tungsten and manganese.

In another aspect, the present disclosure provides a method for preparing a ceramic heat generation body, wherein the method comprises printing electronic paste on a ceramic rod matrix in a decalcomania manner.

According to a preferred embodiment of the present disclosure, the printing in the decalcomania manner comprises printing the electronic paste on a paper-based film to form a decal paper, and preferably, the printing allows an end of the paper-based film to have a lager application amount of electronic paste than an other end.

According to a preferred embodiment of the present disclosure, the paper-based film is made of at least one of a tissue paper, a wood pulp paper, a carbon fiber paper, a synthetic fiber paper, a natural fiber paper, and the like.

According to a preferred embodiment of the present disclosure, the printing in the decalcomania manner further comprises pasting the decal paper on the ceramic rod matrix treated with acid and alkali, and preferably, the printing in the decalcomania manner further comprises firing the ceramic rod matrix pasted with the decal paper at a temperature of 1200-1800° C. for 1-4 hours.

According to a preferred embodiment of the present disclosure, the method further comprises performing dip-glazing after printing in the decalcomania manner, and then firing at a temperature of 1000-1200° C.

In still another aspect, the present disclosure further provides a use of the aforesaid ceramic heat generation body and the ceramic heat generation body prepared by the aforesaid method in a heater for novel tobacco products, and preferably, the use of the aforesaid ceramic heat generation body and the ceramic heat generation body prepared by the aforesaid method in the heater for novel tobacco products is specifically a use in a heater for low-temperature cigarettes.

In summary, the ceramic heat generation body according to the present disclosure and the ceramic heat generation body prepared according to the aforesaid method of the present disclosure have the advantages of quick heat generation and easy insertion and extraction from low-temperature cigarettes. Furthermore, by using the ceramic heat generation body printed with the electronic paste of the present disclosure in the decalcomania manner, the TCR is low and unexpectedly consistent between different batches, which makes it rather easy for resistance control and results in an extremely low defective rate of the product. Due to the excellent performance in low TCR, when the electronic paste of the present disclosure is applied to the ceramal heat generation body, an excellent performance of an unexpectedly consistent and low TCR can be obtained, which ensures that the TCR of the product after fired in each batch is consistent, and the resistance changes little by temperature in the process of use, thereby allowing a simple circuit and a high overall heat generation reliability.

DETAILED DESCRIPTION

The specific embodiments of the present disclosure will be further illustrated in detail hereinafter. It should be understood that the specific embodiments described herein merely illustrate and explain the present disclosure, and does not limit the present disclosure.

The endpoints and any values of the ranges disclosed herein are not limited to the precise range or value, and these ranges or values should be understood to comprise the values close to these ranges or values. In terms of the numerical ranges, one or more new numerical ranges may be obtained by combining endpoint values of each range, or by combining the endpoint value of each range and an individual point value, or by combining the individual point values, and these numerical ranges should be considered as specifically disclosed herein.

As described herein, the term "electronic paste" is a basic material for preparing the ceramic heat generation body and belongs to paste formed by mixing solid powder and liquid solvent uniformly through three-roll rolling processes.

Depending on the difference in use, the electronic paste may be divided into dielectric paste, resistance paste and conductor paste; depending on the difference in substrate type, the electronic paste may be divided into ceramic substrate electronic paste, polymer substrate electronic paste, glass substrate electronic paste, metal insulation substrate electronic paste, and the like; depending on the difference in sintering temperature, the electronic paste may be divided into high-temperature drying electronic paste, medium-temperature drying electronic paste and low-temperature drying electronic paste; depending on the difference in use, the electronic paste may be further divided into general electronic paste and special electronic paste; and depending on the difference in price of the conductive phase, the electronic paste may be divided into precious metal electronic paste and base metal electronic paste.

As adopted herein, the term "temperature coefficient of resistance (TCR)" refers to relative changes in the resistance value when the temperature of the resistance changes by 1 degree (that is, the change rate of the resistance value relative to the resistance). The calculation formula thereof is $TCR=(R_{T2}-R_{T1})/[(T_2-T_1) \times R_{T1}]$, and the unit is ppm/° C., where $T_1$ refers to a first temperature, $T_2$ refers to a second temperature, $R_{T1}$ refers to a resistance value at the first temperature, and $R_{T2}$ refers to a resistance value at the second temperature. The TCR is a parameter closely related to the microstructure of the metal, and has a theoretical maximum value under the absence of any defects. That is, the magnitude of the TCR per se characterizes the performance of the metal process to some extent. During the research and development process or online monitoring of the new technology, the TCR may be adopted to conduct the early monitoring and make rapid evaluation of the reliability of metals.

As adopted herein, the term "printing in a decalcomania manner" refers to a process of printing a designed pattern on a surface of a specific paper or plastic film using a ceramic pigment by a printing process. Afterwards, the patterned paper is moved and pasted to the surface of the matrix, and then sintered at a high temperature, so that the decal is permanently adhered to the surface of the matrix.

In an aspect, the present disclosure provides a ceramic heat generation body. The ceramic heat generation body includes a ceramic rod matrix, wherein an electronic paste is printed on the surface of the ceramic rod matrix in a decalcomania manner.

According to the defects in the prior art to be solved by the present disclosure, the ceramic heat generation body provided by the present disclosure is a rod-shaped ceramic heat generation body commonly used in novel tobacco products, especially in low-temperature cigarettes. Thus, the ceramic heat generation body may generally include a ceramic rod matrix to provide a basic shape. For the material of the ceramic rod matrix, it is not particularly limited and may be a common ceramic matrix material in the art. According to a preferred embodiment, a material of the ceramic rod matrix is at least one of aluminum oxide, silicon nitride, glass, aluminum nitride and silicon carbide.

For tungsten-based paste, tungsten is the main heat generation element. Whereas, the TCR of tungsten is very high, which may cause the entire electronic paste to have a high TCR and make it difficult to acquire a heat generation element having a consistent and reliable TCR. However, the inventor found after research that the batches of products made by selected tungsten pastes having an appropriate composition may have an incredibly consistent TCR, and can further greatly reduce the TCR of the electronic paste, thereby achieving the beneficial effect that the ceramic heat generation body has a low TCR. Thus, in a preferred embodiment, the electronic paste may contain tungsten, manganese, an additive and an organic vehicle, and the additive is selected from at least one of the ruthenium, tellurium, germanium and vanadium. More preferably, a content of the additive may be 0.5-5 wt % (for example, 1.5 wt %, 2 wt %, or 2.5 wt %).

In addition, the type and content of the organic vehicle in the electronic paste of the present disclosure are not particularly limited, and may be the common type and content in the art. In a preferred embodiment, the organic vehicle may be a mixture of terpineol, ethyl cellulose and absolute ethanol, such as 90-95 wt % (e.g., 94 wt %) of terpineol, 3-5 wt % (e.g., 5 wt %) of ethyl cellulose, and 1-3 wt % (e.g., 1 wt %) of absolute ethanol, and preferably, the content of the organic vehicle may be 5-20 wt % based on the total weight of the tungsten and manganese.

According to the present disclosure, in order to facilitate insertion and extraction of the ceramic heat generation body from the low-temperature cigarettes, an end of the ceramic rod matrix may be formed into a sharp shape. Furthermore, according to the common way of inserting and extracting the ceramic heat generation body from the low-temperature cigarettes, the end having the sharp shape may serve as the insertion end to get closer to the cigarette structure, and the other end may get closer to the power source. In addition, the other end may be provided with less electronic paste and thereby have a lower temperature, so as to enable the ceramic heat generation body to protect the power source as much as possible while burning the cigarettes effectively. Thus, in a preferred embodiment, an end of the ceramic rod matrix may be a tapered end, and preferably, the concentration of the electronic paste close to the tapered end in the length direction of the ceramic rod matrix may be higher than the concentration of the electronic paste at the other end.

In another aspect, the present disclosure provides a method for preparing a ceramic heat generation body, wherein the method comprises printing electronic paste on a ceramic rod matrix in a decalcomania manner.

For the ceramic rod matrix and electronic paste in the method for preparing the ceramic heat generation body of the present disclosure, the preferred embodiments of the material and shape of the ceramic rod matrix and the composition of the electronic paste may be the same as those described above, which will not be repeated herein.

According to the present disclosure, in order to enable the ceramic heat generation body to have the advantages of quick heat generation and easy insertion and extraction from low-temperature cigarettes, the electronic paste is adhered to the ceramic rod matrix in a decalcomania manner according to the preparation method of the present disclosure, which not only can effectively reduce the thickness of the ceramic heat generation body but also allows the printed circuit (i.e., the electronic paste) to be directly exposed on the surface of the ceramic heat generation body, thereby greatly improving the heat generation efficiency. On the same account of protecting the power source, an end may also be provided with less electronic paste, so that the end has a lower operating temperature. In addition, during the process of printing in the decalcomania manner, it is easy to design different printed circuit patterns according to needs since the pattern is designed on a plane. Thus, the ceramic heat generation body as prepared can also have a desired appearance. In a preferred embodiment, the printing in the decalcomania manner may comprise printing (such as, skip printing, coating, etc.) the electronic paste on a paper-based film to form a decal paper, and preferably, the printing allows a concentration of the electronic paste at one end of the paper-based film to be greater than the concentration at the other end.

According to the present disclosure, the composition of the paper-based film is not particularly limited, and may be common raw materials in the art. In a preferred embodiment, the paper-based film is made of at least one of a tissue paper, a wood pulp paper, a carbon fiber paper, a synthetic fiber paper, a natural fiber paper, and the like.

According to the present disclosure, after the decal paper of the electronic paste of the present disclosure is formed, the decal paper may be transferred to the ceramic rod matrix, and then undergo subsequent processing to completely adhere the electronic paste to the surface of the ceramic rod matrix. In a preferred embodiment, the printing in the decalcomania manner further comprises pasting the decal paper on the ceramic rod matrix treated with acid and alkali, and preferably, the printing in the decalcomania manner further comprises firing the ceramic rod matrix pasted with the decal paper (preferably under a mixed gas of $H_2$ and $N_2$) at a temperature of 1200-1800° C. for 1-4 hours. In a more preferred embodiment, prior to the firing step, the printing in the decalcomania manner further comprises drying the ceramic rod matrix pasted with the decal paper at a temperature of 100-150° C., and then removing glue at a temperature of 300-600° C.

According to the present disclosure, a glaze layer may be provided on the surface of the ceramic heat generation body to insulate, strengthen and protect the heater. Thus, in a preferred embodiment, the method further comprises performing dip-glazing after printing in the decalcomania manner, and then firing at a temperature of 1000-1200° C. After completion of the firing, the ceramic heat generation body may be further provided with a lead wire. Thus, the method of the present disclosure may further comprise surface-treating the ceramic heat generation body at solder joints, and then fastening the lead wire, solder joints and solder by a wire-bonding tool to get into a furnace for lead soldering at about 700° C., so as to form the finished product.

The aforementioned respective preferred embodiments of the present disclosure may be used alone or in combination with other preferred embodiments. In a particularly preferred embodiment, the method for preparing the ceramic heat generation body of the present disclosure comprises: (1) designing, based on product requirements, a diameter and a length of a ceramic rod matrix, electronic paste meeting the requirements, a printing weight, and molds and tools required for production; (2) in a clean room, skip-printing, by a precision screen printer, a part of the electronic paste as prepared on a surface of a paper base through a circuit of a screen printing plate to form a decal paper, wherein the surface of the paper base is coated with water-soluble glue, and the paper base is made of at least one of a tissue paper, a wood pulp paper, a carbon fiber paper, a synthetic fiber paper, a natural fiber paper, and the like; (3) pasting the decal paper printed with a heat generation circuit on the ceramic rod matrix treated with acid and alkali; (4) drying the ceramic rod matrix pasted with the decal paper at a temperature of 100-150° C., and then removing glue at a temperature of 300-600° C.; (5) after removing the glue, firing as a whole under a mixture of $H_2$ and $N_2$ at a temperature of 1200-1800° C. for 1-4 hours; (6) putting a layer of transparent thin glaze on the ceramic heat generation rod after fired in a dip-glazing manner, and then pushing into a reducing atmosphere furnace to be fired at a temperature of 1000-1200° C.; and (7) after the ceramic heat generation body as fired is surface-treated at the solder joints, fastening the lead wire, solder joints, and solder by a wire-bonding tool to get into the furnace for lead soldering at about 700° C., thereby forming a finished product.

In still another aspect, the present disclosure further provides a use of the aforesaid ceramic heat generation body and the ceramic heat generation body prepared by the aforesaid method in a heater for novel tobacco products, and in particular a use in a heater for low-temperature cigarettes.

EXAMPLES

An organic vehicle is prepared by a mixture of 94 wt % of terpineol, 5 wt % of ethyl cellulose and 1 wt % of absolute ethanol, and the preparation is implemented by weighing the terpineol, ethyl cellulose and absolute ethanol in proportions and then mixing uniformly with a magnetic stirrer at a water bath temperature of 90° C. Firstly, 90 parts by weight of tungsten powder and 10 parts by weight of manganese powder are taken and mixed uniformly. Afterwards, the mixed powder is mixed with 10 parts by weight of organic vehicle and then put together into a planetary ball mill for a ball milling, wherein the absolute ethanol serves as a ball milling medium, and the weight ratio of the mixture to the ball milling medium is 1.5:1. In addition, the ball mill is run at a speed of 500 r/min for 1.5 h to prepare the electronic paste composition C1. Then, 5 batches of the electronic paste composition C1 are obtained in the same way.

Based on the content shown in Table 1, the electronic paste compositions C2-C8 are prepared in the same way as described above, with each electronic paste being prepared 5 batches. Then, all batches of the electronic paste composition are printed on the ceramic matrix by screen printing or other conventional techniques in the art to form heat generation elements. The resistance values of the heat generation elements as acquired from the electronic paste compositions C1-C8 at temperatures of 25° C., 83° C., 150° C., and 230° C. are measured, the results are shown in Table 2. Then, the TCR is acquired based on the resistance values of respective batch through the least square method and the linear fitting. For each of the electronic paste compositions C1-C8, the average TCR of 5 batches and the deviation rate of TCR for each batch ((TCRn−Average TCR)/Average TCR, where n is 1, 2, 3, 4 or 5) are calculated based on TCRs of the 5 batches, which are TCR1, TCR2, TCR3, TCR4 and TCR5 respectively. Furthermore, the average deviation rate of TCRs of the 5 batches (an average value of the deviation rates of TCRs of the 5 batches) is calculated, as shown in Table 2

TABLE 1

| | | Tungsten | Manganese | Iron | Molybdenum | Ruthenium | Germanium | Vanadium | Tellurium |
|---|---|---|---|---|---|---|---|---|---|
| C1 | Tungsten Manganese | 90 | 10 | — | — | — | — | — | — |
| C2 | Tungsten Manganese Iron | 90 | 10 | 2 | — | — | — | — | — |
| C3 | Tungsten Manganese Molybdenum | 90 | 10 | — | 2 | — | — | — | — |
| C4 | Tungsten Ruthenium | 98 | — | — | — | 2 | — | — | — |
| C5 | Tungsten Manganese Ruthenium | 90 | 10 | — | — | 1 | — | — | — |
| C6 | Tungsten Manganese Germanium | 90 | 10 | — | — | — | 0.5 | — | — |
| C7 | Tungsten Manganese Vanadium | 90 | 10 | — | — | — | — | 5 | — |
| C8 | Tungsten Manganese Tellurium | 90 | 10 | — | — | — | — | — | 2 |

TABLE 2

| | | TCR1 | TCR2 | TCR3 | TCR4 | TCR5 | Average TCR | Average deviation rate |
|---|---|---|---|---|---|---|---|---|
| C1 | Tungsten Manganese | 3742 | 3528 | 3854 | 3928 | 3468 | 3704 | 4.45% |
| C2 | Tungsten Manganese Iron | 3516 | 3324 | 3418 | 3589 | 3615 | 3492 | 2.78% |
| C3 | Tungsten Manganese Molybdenum | 2995 | 3258 | 3196 | 3298 | 3028 | 3155 | 3.64% |
| C4 | Tungsten Ruthenium | 3395 | 3216 | 3329 | 3428 | 3365 | 3347 | 1.77% |
| C5 | Tungsten Manganese Ruthenium | 3275 | 3329 | 3314 | 3228 | 3295 | 3288 | 0.89% |
| C6 | Tungsten Manganese Germanium | 3108 | 3182 | 3189 | 3203 | 3199 | 3176 | 0.70% |

TABLE 2-continued

|    |                                  | TCR1 | TCR2 | TCR3 | TCR4 | TCR5 | Average TCR | Average deviation rate |
|----|----------------------------------|------|------|------|------|------|-------------|------------------------|
| C7 | Tungsten Manganese Vanadium      | 2988 | 3077 | 2923 | 3081 | 3029 | 3020        | 1.70%                  |
| C8 | Tungsten Manganese Tellurium     | 3419 | 3499 | 3386 | 3420 | 3398 | 3424        | 0.87%                  |

As illustrated in the aforesaid example, the electronic paste compositions (C5-C8) of the present disclosure can prepare heat generation elements having an excellent performance. The average deviation of the TCR between the plurality of batches is significantly lower than the average deviation of the TCR of the heat generation elements prepared from other electronic paste compositions (C1-C4), which thereby shows the excellent performance in having a consistent and low TCR.

The preferred embodiments of the present disclosure are described in detail above, but the present disclosure is not limited to the specific details in the above embodiments. Various simple modifications can be made to the technical solution of the present disclosure within the scope of the technical concept of the present disclosure, and these simple modifications all fall within the protection scope of the present disclosure.

In addition, it should be understood that the various specific technical features described in the aforesaid specific embodiments can be combined in any suitable manner without contradiction. In order to avoid unnecessary repetition, the various possible combinations are not described separately in the present disclosure.

Furthermore, different embodiments of the present disclosure can also be combined arbitrarily, as long as they do not violate the concept of the present disclosure, and they should also be regarded as the content disclosed by the present disclosure.

The invention claimed is:

1. A ceramic heat generation body, comprising:
a ceramic rod matrix, wherein a resistance heat generation element is provided on a surface of the ceramic rod matrix, and the resistance heat generation element is an alloy containing tungsten, manganese and at least one selected from ruthenium, tellurium, germanium, and vanadium;
wherein the resistance heat generation element is prepared by printing an electronic paste in a decalcomania manner, and the electronic paste contains tungsten, manganese, an additive and an organic vehicle, the additive being selected from at least one of ruthenium, tellurium, germanium and vanadium;
wherein a weight ratio of the tungsten and manganese is 7:3 to 9.5:0.5;
wherein a content of the additive is 0.5-5 wt % based on a total weight of the tungsten and manganese.

2. The ceramic heat generation body according to claim 1, wherein a material of the ceramic rod matrix is at least one of aluminum oxide, silicon nitride, glass, aluminum nitride and silicon carbide.

3. The ceramic heat generation body according to claim 1, wherein an end of the ceramic rod matrix is a tapered end, and the resistance heat generation element near the tapered end in a length direction of the ceramic rod matrix has a size larger than that of another end.

4. The ceramic heat generation body according to claim 3, wherein the organic vehicle is a mixture of terpineol, ethyl cellulose and absolute ethanol, and a content of the organic vehicle is 5-20 wt % based on the total weight of the tungsten and manganese.

5. The ceramic heat generation body according to claim 1, wherein the organic vehicle is a mixture of terpineol, ethyl cellulose and absolute ethanol, and a content of the organic vehicle is 5-20 wt % based on the total weight of the tungsten and manganese.

6. A method for preparing the ceramic heat generation body according to claim 1, wherein the method comprises printing electronic paste on the ceramic rod matrix in a decalcomania manner.

7. The method according to claim 6, wherein the printing in the decalcomania manner comprises printing the electronic paste on a paper-based film to form a decal paper.

8. The method according to claim 7, wherein the printing allows an end of the paper-based film to have a larger application amount of electronic paste than another end.

9. The method according to claim 7, wherein the paper-based film is made of at least one of a tissue paper, a wood pulp paper, a carbon fiber paper, a synthetic fiber paper, a natural fiber paper, and the like.

10. The method according to claim 7, wherein the printing in the decalcomania manner further comprises pasting the decal paper on the ceramic rod matrix treated with acid and alkali, and the printing in the decalcomania manner further comprises firing the ceramic rod matrix pasted with the decal paper at a temperature of 1200-1800° C. for 1-4 hours.

11. The method according to claim 6, further comprising: performing dip-glazing after printing in the decalcomania manner, and then firing at a temperature of 1000-1200° C.

12. A use of the ceramic heat generation body according to claim 1 and the ceramic heat generation body prepared by the method according to claim 6 in a heater for novel tobacco products.

13. The use according to claim 12, wherein the novel tobacco products are low-temperature cigarettes.

* * * * *